(12) United States Patent
Suyama

(10) Patent No.: US 10,254,401 B2
(45) Date of Patent: Apr. 9, 2019

(54) MOUNTING STRUCTURE FOR SONAR SENSOR

(75) Inventor: Hitoshi Suyama, Hiratsuka (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 481 days.

(21) Appl. No.: 14/112,480

(22) PCT Filed: Feb. 24, 2012

(86) PCT No.: PCT/JP2012/054599
§ 371 (c)(1),
(2), (4) Date: Oct. 17, 2013

(87) PCT Pub. No.: WO2012/144270
PCT Pub. Date: Oct. 26, 2012

(65) Prior Publication Data
US 2014/0036632 A1    Feb. 6, 2014

(30) Foreign Application Priority Data
Apr. 20, 2011    (JP) ................ 2011-093813

(51) Int. Cl.
*G01S 15/02* (2006.01)
*B60R 19/48* (2006.01)
(Continued)

(52) U.S. Cl.
CPC ............ *G01S 15/02* (2013.01); *B60R 19/483* (2013.01); *G01S 7/521* (2013.01); *G01S 2015/938* (2013.01)

(58) Field of Classification Search
CPC ...................................................... G01S 15/02
(Continued)

(56) References Cited

U.S. PATENT DOCUMENTS 6,318,774 B1 * 11/2001 Karr ................ B60R 19/483
                                                    293/102
7,554,248 B2    6/2009 Oda et al.
(Continued)

FOREIGN PATENT DOCUMENTS

CN            1255098 A       5/2000
CN          101241183 A       8/2008
(Continued)

OTHER PUBLICATIONS

European Extended Search Report, dated Mar. 12, 2015, 6 pages.
Japanese Office Action, dated Aug. 26, 2014, 3 pages.
Chinese Office Action, dated Sep. 22, 2014, 6 pages.

*Primary Examiner* — Luke D Ratcliffe
(74) *Attorney, Agent, or Firm* — Foley & Lardner LLP

(57) ABSTRACT

A mounting structure for a sonar sensor includes the sonar sensor provided with a detection plane for detecting a distance to an object by sending an ultrasound from the detection plane and receiving a reflective wave reflected by the object, a resin member in which a hole is formed and on which the sonar sensor is mounted, and a holder that has a cover for covering the detection plane and holds the sonar sensor. The sonar sensor is installed in the holder. The holder is attached to the resin member so that the cover is inserted into the hole from an inside of the resin member and an outer surface of the cover is made flush-surfaced with an outer surface of the resin member. At least the cover is made of resin in the holder. According to the mounting structure, painting cost can be reduced by commonalizing painting materials.

4 Claims, 2 Drawing Sheets

(51) Int. Cl.
  *G01S 7/521* (2006.01)
  *G01S 15/93* (2006.01)
(58) Field of Classification Search
  USPC .......................................................... 367/173
  See application file for complete search history.

(56) References Cited

U.S. PATENT DOCUMENTS

| | | |
|---|---|---|
| 2006/0158066 A1 | 7/2006 | Oda et al. |
| 2006/0232081 A1* | 10/2006 | Sato ...................... B60R 19/483 293/117 |
| 2007/0194892 A1* | 8/2007 | Schaaf .................. B60R 19/483 340/435 |
| 2008/0184802 A1* | 8/2008 | Sato ........................ G01S 7/521 73/632 |

FOREIGN PATENT DOCUMENTS

| | | |
|---|---|---|
| DE | 10 2008 007 042 A1 | 8/2008 |
| JP | 2001-527480 A | 12/2001 |
| JP | 2004-264264 A | 9/2004 |
| JP | 2006-203563 A | 8/2006 |
| JP | 2008-191007 A | 8/2008 |
| WO | WO 02/12027 A1 | 2/2002 |

\* cited by examiner

MOUNTING STRUCTURE FOR SONAR SENSOR

TECHNICAL FIELD

The present invention relates to a mounting structure for a sonar sensor that detects a distance to a detection object.

BACKGROUND ART

A Patent Literature 1 listed below discloses a mounting structure in which a sonar sensor for detecting a distance to a detection object is mounted in a bumper without degrading its appearance. In the mounting structure, the sonar sensor is attached, by a holder, to a through hole opened on the bumper so that a detection plane of the sonar sensor and an outer surface of the bumper form a continuous smooth surface (flush surface). Since the detection plane of the sonar sensor and the outer surface of the bumper form a continuous smooth surface (flush surface), its appearance looks good. In addition, in the mounting structure, the detection plane and the bumper are painted in the same color in order to make its appearance better.

CITATION LIST

Patent Literature

Patent Literature 1: Japanese Patent Unexamined Publication (Translation of PCT Application) No. 2001-527480 (U.S. Pat. No. 6,318,774)

SUMMARY OF INVENTION

However, a material of the detection plane is generally made of metal such as aluminum, but the bumper is made of resin such as PP (polypropylene). Therefore, according to each material, it is imperative to paint the detection plane by a painting material for metal and to paint the bumper by a painting material for resin. As a result, it is needed to paint them by using different types of paint materials and thereby painting cost increases.

An object of the present invention is to provide a mounting structure for a sonar sensor that can reduce painting cost by commonalizing painting materials.

An aspect of the present invention provides a mounting structure for a sonar sensor comprising: the sonar sensor that includes a sensor main body having a detection plane and detects a distance to a detection object by sending an ultrasound from the detection plane and receiving a reflective wave reflected by the detection object; a resin member in which a hole is formed and on which the sonar sensor is mounted; and a holder that has a cover for covering the detection plane and holds the sonar sensor, wherein the sonar sensor is installed in the holder, the holder is attached to the resin member so that the cover is inserted into the hole from an inside of the resin member and an outer surface of the cover is made almost flush-surfaced with an outer surface of the resin member, and at least the cover is made of resin in the holder.

DESCRIPTION OF EMBODIMENTS

Figure 1:
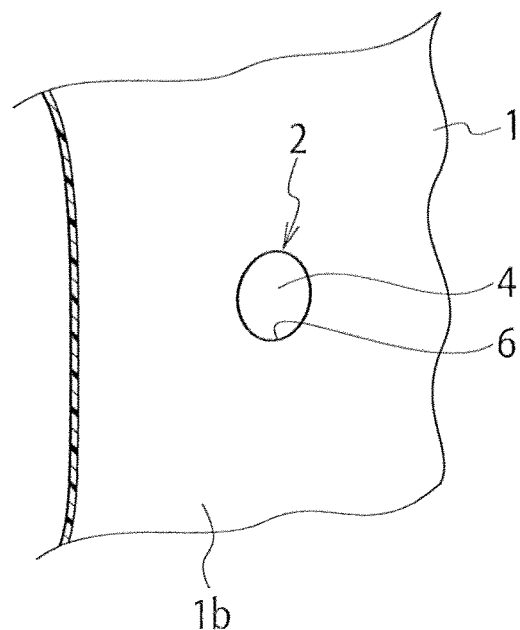
FIG. 1 is a perspective view showing a mounting structure of a sonar sensor according to an embodiment viewed from a side of a front surface of a bumper.
Figure 2:
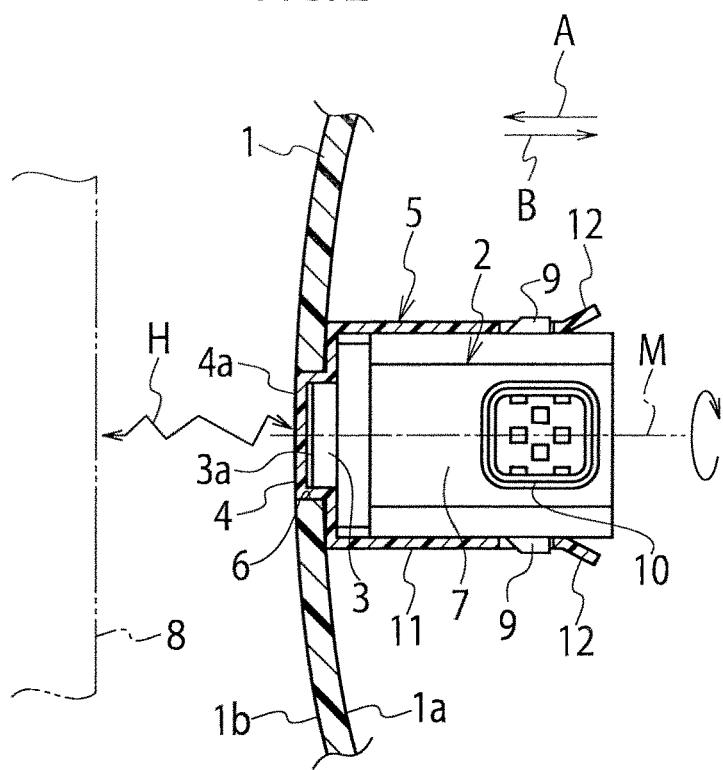
FIG. 2 is a cross-sectional view of the embodiment.
Figure 3:
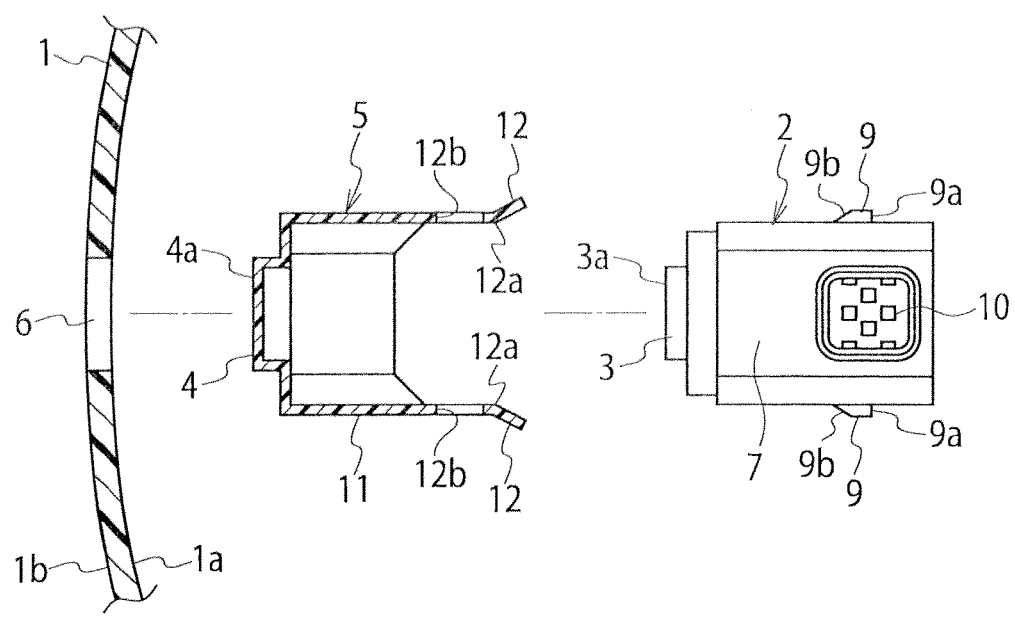
FIG. 3 is an exploded cross-sectional view of the embodiment.

An embodiment of a mounting structure for a sonar sensor will be explained with reference to the drawings. In the mounting structure according to the present embodiment, the sonar sensor mounted on a bumper (a resin member) of a vehicle via a holder. FIG. 1 shows the sonar sensor mounted on the bumper viewed from a side of a front surface of the bumper. FIG. 2 shows a cross-sectional view of the sonar sensor mounted on the bumper via the holder. FIG. 3 shows a cross-sectional view of the holder and the sonar sensor before they are mounted on the bumper. Note that, in the cross-sectional views of FIG. 2 and FIG. 3, a side face of the sonar sensor 2 is shown.

As shown in FIG. 1, the holder 5 having a cover 4 for covering a detection plane 3a of the sonar sensor 2 is fixed on the bumper 1. A hole 6 into which the cover 4 covering the detection plane 3a is inserted is formed in the bumper 1. The hole 6 is a circular hole penetrating the bumper 1 in its thickness direction. In the bumper 1, its outer surface 1b that is on an opposite side to its inner surface 1a and to which the sonar sensor 2 is attached is on an outer side of a vehicle body. The outer surface 1b is painted.

As show in FIG. 2, the sonar sensor 2 sends an ultrasound wave H toward a detection object 8 from the detection plane 3a of its sensor main body 7, and receives a reflective wave reflected by the detection object 8 to detect a distance to the detection object 8. Lock pawls 9 (see FIG. 3) for preventing the sonar sensor 2 installed in the holder 4 from dropping off are protruded from side faces of the sensor main body 7. The installed sonar sensor 2 is held by the holder 4 so as not to drop off easily along its removal direction B opposite to its insertion direction A shown in FIG. 2. In addition, the sensor main body 7 is provided with a connecter 10 for an electrical connection with a controller (not shown). The connector 10 is connected with a connector provided at an end of a body harness on the vehicle body. The connector 10 is provided on one rectangular or polygonal side face of the sensor main body 7.

The holder 5 is formed as a hollow cylindrical casing composed of the above-explained cover 4 for covering the detection plane 3a of the sonar sensor 2 and a holder main body 11 for surrounding the sensor main body 7.

The cover 4 has a low-height hollow cylindrical shape so as to cover an entire of a detection portion 3 of the sonar sensor 2. The cover 4 has a thickness enabling penetration of the ultrasound wave H sent from the detection plane 3a of the sonar sensor 2. Note that, if the sonar sensor 2 is an ultrasound sensor, an elastic material or an air space is provided, for acoustic separation, between the detection plane 3a as an oscillating diaphragm and the cover 4. In the present embodiments, the cover 4 is placed to be separated from the detection plane 3a, thereby creating an air gap between the cover 4 and the detection plane 3a, as indicated in FIG. 2. By providing the air gap, acoustic separation is provided and undesired effects due to the detection plane 3a being directly contacted with the cover 4 may be avoided.

An internal chamber capable of accommodating the sensor main body 7 is formed within the holder main body 11. In addition, clipping tabs 12 engaged with the above-explained lock pawls 9 are formed in the holder main body 11. Holes 12b engaged with rear edges 9a of the lock pawls 9 are formed on the clipping tabs 12 (see FIG. 3). In addition, a bent edge 12a bent outward is formed at each edge of the clipping tabs 12 (see FIG. 3).

The clipping tabs 12 are elastically deformable. When the sonar sensor 2 is installed into the holder 5, sloped front-end surfaces 9b of the lock pawls 9 push the bent edges 12a outward first to bend and thereby the clipping tabs 12 are elastically bent outward. Then, when the sonar sensor 2 has been inserted to a position shown in FIG. 2, the clipping tabs 12 restore their initial shapes by their own elastic restoring force to engage the rear edges 9a of the lock pawls 9 with the holes 12b. As a result, the sonar sensor 2 is prevented from dropping off along the removal direction B. Note that the holes 12b may be formed as recesses.

In the holder 5, at least the cover 4 is formed of a resin material identical to a resin material of the bumper 1. Of course, an entire of the holder 5 including the cover 4 may be formed of a resin material identical to a resin material of the bumper 1. The holder 5 configured as explained above is fixed to the inner surface 1a from an inside of the bumper 1. Various types of fixing methods can be applied to the fixation of the holder 5 to the inner surface 1a, for example, by adhesive agent, welding, spray-applied fixation, screw fastening, or the like.

To fix the sonar sensor 2 on the bumper 1 via the holder 5, the holder 5 is fixed on the inner surface 1a of the bumper 1 first. Specifically, the cover 4 of the holder 5 is inserted, into the hole 6 from an inside of the bumper 1 first. At this time, an outer surface 4a of the cover 4 is made flush-surfaced (forms a continuous smooth surface) with the outer surface 1b of the bumper 1. In this state, the holder 5 is fixed on the inner surface 1a by the above-explained fixing method.

Subsequently, the sonar sensor 2 is inserted into the inside of the holder 5 so as to accommodate the detection portion 3 in the cover 4. When the sonar sensor 2 has been inserted into the inside of the holder 4, the detection, portion 3 is covered by the cover 4 and the sensor main body 7 is surrounded by the holder main body 11. In addition, the sonar sensor 2 is prevented from dropping off from the holder 5 by the engagements of the clipping tabs 12 and the lock pawls 9.

Since the cover 4 is interposed between the hole 6 of the bumper 1 and the detection portion 3, a gap between the hole 6 and the detection portion 3 becomes invisible (or, almost invisible) from outside and its appearance is improved. Note that, in a prior-art sonar sensor, if a sonar sensor is installed so that its detection portion is directly contacted with a bumper, an ultrasound wave sent from its detection plane is propagated to detection planes of other neighboring sonar sensors through the bumper and it causes a malfunction. In order to prevent such a malfunction, it is needed, in a prior-art sonar sensor, to provide a gap between the detection portion and the bumper so as not to directly contact them with each other. However, such a gap is filled with the cover 4 in the present embodiment, so that the bumper 1 and the detection portion 3 are not directly contacted with each other and no gap visible from an outside of the bumper 1 is generated.

In addition, the outer surface 4a of the cover 4 and the outer surface 1b of the bumper 1 are painted by an identical painting material by which the entire of the bumper 1 is painted. Generally, the holder 5 is preliminarily attached to the bumper 1 and then the outer surface 1b of the bumper 1 and the outer surface 4a of the cover 4 are painted by an identical resin painting material (in a single painting process). According to this, the painting material enters into a seam between the outer surface 1b of the bumper 1 and the outer surface 4a of the cover 4, so that its outer surface becomes more flush-surfaced and is formed as a continuous smoother surface to improve its appearance further. In addition, it can be also prevented that rainwater or the like infiltrates into the inside through the seam. Further, since painting is made by an identical painting material on an identical resin material (in a single painting process), an aging color change of the painting material becomes equal on both the outer surface 1b of the bumper 1 and the outer surface 4a of the cover 4. As a result, an aging change of its appearance can be improved further. It can be easily determined through observation of a target portion after painting whether or not the holder 5 is preliminarily attached to the bumper 1 and then the outer surface 1b of the bumper 1 and the outer surface 4a of the cover 4 are painted by an identical resin painting material (in a single painting process). Note that the holder 5 may be attached to the bumper 1 after the bumper 1 and the cover 4 are painted separately. Also in this case, an aging change of its appearance can be improved.

In addition, since at least the cover 4 of the holder 5 and the bumper 1 are molded of an identical resin material and the outer surface 4a of the cover 4 and the outer surface 1b of the bumper 1 are painted by an identical painting material, it is possible to paint both of them with one kind of painting material by which the bumper 1 is painted in a single painting operation. Therefore, color combinations and color adjustments required for painting separately with different kinds of painting materials are not needed, so that the painting operation can be simplified. Note that, also in a multi-layer painting, its painting operation can be simplified because the outer surface 4a of the cover 4 and the outer surface 1b of the bumper 1 are painted by each painting material in each single painting process.

In addition, since the cover 4 for covering the detection plane 3a is inserted from an inside of the bumper 1 and the outer surface 1b of the bumper 1 and the outer surface 4a of the cover 4 are made flush-surfaced with each other, a gap between the detection portion 3 and an inner edge of the hole 6 is filled with the cover 4 and thereby the gap is reduced. Therefore, the gap visible from an outside of the bumper 1 is reduced and thereby its appearance is improved.

In addition, the cover 4 has a thickness enabling penetration of the ultrasound wave H sent from the detection plane 3a, so that a function of the sonar sensor 2 is not obstructed and the sonar sensor 2 can deliver superior performance.

In the above embodiment, adopted is a structure in which the sonar sensor 2 is inserted into the inside of the holder 5 and held therein. However, adopted may be a structure in which the sonar sensor 2 can rotate in the holder 5 about a central axis M shown in FIG. 2. If the sonar sensor 2 is rotatable in the holder 5, the connector 10 of the sonar sensor 2 can be oriented in an optimal orientation, even in both cases where a connector at an end of a body harness is located on a left side and a right side of the sonar sensor 2. Therefore, a length of the body harness can be shortened.

The entire contents of a Japanese Patent Application No. 2011-93813 (filed Apr. 20, 2011) are incorporated herein by reference. Although the invention has been described above by reference to certain embodiments of the invention, the invention is not limited to the embodiments described above. Scope of the present invention is determined in the context of the claims.

INDUSTRIAL APPLICABILITY

The present invention can be applied to a mounting structure for a sonar sensor in which the sonar sensor is mounted on a bumper (a resin member) in a vehicle or the like via a holder made of resin.

The invention claimed is:

1. A mounting structure for a sonar sensor comprising:

the sonar sensor that includes a sensor main body having a detection plane, the sonar sensor configured to detect a distance to a detection object by sending an ultrasound wave from the detection plane and receiving a reflective wave reflected by the detection object;

a resin member in which a hole is formed and on which the sonar sensor is mounted; and a holder that has a cover for covering the detection plane and holds the sonar sensor, wherein the sonar sensor is installed in the holder, the holder is attached to the resin member so that the cover is inserted into the hole from an inside of the resin member and an outer surface of the cover is made almost flush-surfaced with an outer surface of the resin member, at least the cover is made of resin in the holder, the cover and the resin member are made of an identical resin material, the outer surface of the cover and the outer surface of the resin member have a painted coating comprising an identical painting material, the identical painting material is painted on the outer surface of the cover and the outer surface of the resin member after the holder is attached to the resin member, the sonar sensor is rotatable in the holder and fixed in the holder at an arbitrary rotational position, and the cover is placed to be separated from the detection plane, thereby creating an air gap between the cover and the detection plane.

2. The mounting structure for a sonar sensor according to claim 1, wherein the cover has a thickness enabling penetration of an ultrasound wave sent from the detection plane.

3. The mounting structure for a sonar sensor according to claim 1, wherein the sonar sensor is configured to rotate in alignment to a connector attached to a side of the sensor main body.

4. The mounting structure for a sonar sensor according to claim 1, wherein the outer surface of the cover and the outer surface of the resin member form a continuous surface.

* * * * *